US012224838B2

(12) United States Patent
Hart et al.

(10) Patent No.: US 12,224,838 B2
(45) Date of Patent: Feb. 11, 2025

(54) METHOD OF CONTROLLING A RADIO ACCESS POINT

(71) Applicant: BRITISH TELECOMMUNICATIONS PUBLIC LIMITED COMPANY, London (GB)

(72) Inventors: Jonathan Hart, London (GB); Milan Lalovic, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 0 days.

(21) Appl. No.: 18/258,177

(22) PCT Filed: Nov. 12, 2021

(86) PCT No.: PCT/EP2021/081587
§ 371 (c)(1),
(2) Date: Jun. 16, 2023

(87) PCT Pub. No.: WO2022/128277
PCT Pub. Date: Jun. 23, 2022

(65) Prior Publication Data
US 2024/0056158 A1    Feb. 15, 2024

(30) Foreign Application Priority Data

Dec. 18, 2020  (GB) ..................................... 2020120
Dec. 18, 2020  (GB) ..................................... 2020140

(51) Int. Cl.
*H04B 7/06*   (2006.01)
*H04W 16/10*  (2009.01)

(52) U.S. Cl.
CPC .......... *H04B 7/0691* (2013.01); *H04W 16/10* (2013.01)

(58) Field of Classification Search
CPC .............................. H04B 7/0691; H04W 16/10
See application file for complete search history.

(56) References Cited

U.S. PATENT DOCUMENTS 7,355,998 B2    4/2008  Briancon et al.
10,278,123 B2   4/2019  Wang et al.
(Continued)

FOREIGN PATENT DOCUMENTS

EP    3503609 A1   6/2019
EP    3681105 A1   7/2020
(Continued)

OTHER PUBLICATIONS

Combined Search and Examination Report for GB2212552.0 dated Feb. 7, 2023 (6 pages).
Combined Search and Examination Report for GB2104659.4 dated Aug. 23, 2021 (8 pages).
Search Report for GB2020120.8 dated May 11, 2021 (4 pages).
(Continued)

*Primary Examiner* — Rahel Guarino
(74) *Attorney, Agent, or Firm* — Nixon & Vanderhye P.C.

(57) ABSTRACT

A method of operating a radio access point so as to provide network slicing functionality, the radio access point providing a radio access network for a telecommunications network and the radio access point comprising a plurality of antenna elements, the method comprising the steps of: reserving a portion of the plurality of antenna elements for use only by a given network slice, the reserved portion of the plurality of antenna elements forming a set of antenna elements; receiving, at each of the plurality of antenna elements, a wireless signal from a User Equipment of the telecommunications network identifying the UE from the received wireless signal; determining that the identified UE is allocated to the given network slice; in response to the determining, the radio access point processing only the wireless signal as received by the set of antenna elements.

20 Claims, 4 Drawing Sheets

(56) References Cited

U.S. PATENT DOCUMENTS

| | | |
|---|---|---|
| 10,349,324 B2 | 7/2019 | Tsai |
| 10,574,317 B2 | 2/2020 | Rakib |
| 2014/0133322 A1 | 5/2014 | Steer et al. |
| 2016/0219567 A1 | 7/2016 | Gil et al. |
| 2017/0135099 A1 | 5/2017 | Song et al. |
| 2017/0311290 A1 | 10/2017 | Adjakple et al. |
| 2018/0176900 A1 | 6/2018 | Rong et al. |
| 2018/0248263 A1 | 8/2018 | Petersson et al. |
| 2020/0170052 A1* | 5/2020 | Yang ............... H04W 28/26 |
| 2020/0252908 A1 | 8/2020 | Liu et al. |

FOREIGN PATENT DOCUMENTS

| | | |
|---|---|---|
| GB | 2602117 A | 6/2022 |
| GB | 2602120 A | 6/2022 |
| WO | 2017143047 A1 | 8/2017 |
| WO | 2017197273 A1 | 11/2017 |
| WO | 2018045877 A1 | 3/2018 |
| WO | 2018119153 A2 | 6/2018 |
| WO | 2020109872 A1 | 6/2020 |
| WO | 2022128277 A1 | 6/2022 |

OTHER PUBLICATIONS

Search Report for GB2020140.6 dated May 11, 2021 (4 pages).
Hassan Halabian and Peter Ashwood-Smith, "Capacity Planning for 5G Packet-based Front-haul", 2018 IEEE Wireless Communications and Networking Conference (WCNC), 2018 (6 pages).
International Search Report and Written Opinion for PCT/EP2021/081587 dated Feb. 28, 2022 (13 pages).
International Search Report and Written Opinion for PCT/EP2021/081589 dated Feb. 28, 2022 (14 pages).
Salvatore D'Oro et al., "Low-Complexity Distributed Radio Access Network Slicing: Algorithms and Experimental Results", 1063-6692, IEEE/ACM Transactions on Networking, 2018 (16 pages).
Extended European Search Report for European Application No. 22193004.3 dated Jan. 26, 2023 (10 pages).
Search Report for GB2104659.4 dated Aug. 23, 2021 (8 pages).
Search Report for GB2020120.8 dated Feb. 16, 2023 (3 pages).
Search Report for GB2212552.0 dated Feb. 7, 2023 (6 pages).
Search Report for GB2020140.8 dated Feb. 16, 2023 (3 pages).
International Search Report and the Written Opinion of the International Searching Authority for International Application No. PCT/EP2023/069248, dated Oct. 9, 2023 (16 pages).
Patents Act 1977: Intention to Grant under Section 18(4) dated Jun. 20, 2024, issued for GB Application No. GB2212552.0 (2 pages).

\* cited by examiner

METHOD OF CONTROLLING A RADIO ACCESS POINT

CROSS-REFERENCE TO RELATED APPLICATIONS

This application is the U.S. national phase of International Application No. PCT/EP2021/081587 filed Nov. 12, 2021 which designated the U.S. and claims priority to GB Application No. 2020120.8 filed Dec. 18, 2020, and GB Application No. 2020140.6 filed Dec. 18, 2020, the entire contents of each of which are hereby incorporated by reference.

FIELD OF INVENTION

The present invention relates to a method of operating a radio access point in a radio access network of a telecommunications network, and in particular to a method of configuring a radio access point for the provision of network slicing functionality.

BACKGROUND

In cellular telecommunications, network slicing is a method of virtualising a network so as to create multiple logical networks within a single physical network. This is typically undertaken to offer differentiated service models, which might include varying performance and/or stability characteristics within a network, and it is supported by the fact that network slices are isolated from one another other during operation. As a result, high traffic or a large number of users on one slice is unable negatively to affect other network slices.

For example, network slices may be configured to provide specialised functions, including: exclusively serving emergency services (which demands, at least, high reliability); enhanced Mobile Broadband (eMBB); and Massive Machine Type Communications (MMTC).

To facilitate effective network slicing in cellular telecommunications, it is desirable that end-to-end network slicing is provided, in which a network slice can be provided from the Radio Access Network (RAN) through the transport network and on to the core network.

However, solutions to implement network slicing as part of the RAN may require dedicated radio spectrum, dedicated base stations, and/or specialised RAN schedulers, which may in turn require significant financial cost to implement and operational complexity.

It is an aim of the present invention to at least alleviate some of the aforementioned problems.

BRIEF SUMMARY OF EXAMPLE EMBODIMENTS OF THE INVENTION

According to a first aspect of the present invention, there is provided: a method of operating a radio access point so as to provide network slicing functionality, said radio access point providing a radio access network for a telecommunications network and said radio access point comprising a plurality of antenna elements, the method comprising the steps of: reserving a portion of the plurality of antenna elements for use only by a given network slice, the reserved antenna element(s) forming a set of antenna elements; receiving, at each of the plurality of antenna elements, a wireless signal from a User Equipment (UE) of the telecommunication network; identifying the UE from the received wireless signal; determining that the identified UE is allocated to the given network slice; in response to said determining, the radio access point processing only the or each wireless signal as received by the set of antenna elements.

As used herein, the term "portion" in the context of the plurality of antenna elements preferably connotes some, but not all of, the plurality of antenna elements.

Preferably, the step of processing is performed without processing any wireless signal that is received by an antenna element that is not a member of the set of antenna elements. Optionally, said processing comprises preparing the wireless signal for onward communication from the radio access point (for example to a backhaul and/or core of the telecommunications network). Optionally, the step of identifying the UE is performed by processing the wireless signal so as to retrieve a unique identifier of the UE, wherein said unique identifier may be a subscriber identity value. Preferably, the step of determining that the identified UE is allocated to the network slice is performed by retrieving a mapping (optionally stored at the radio access point) associating the identified UE to the network slice.

Preferably, the method further comprises the step of storing information associating a unique identity of each antenna element in the set of antenna elements and a unique identity of the network slice, wherein said processing is performed subsequent to retrieving the identity of each antenna element in the set of antenna elements in dependence on identifying that the UE is allocated to the network slice. Preferably, the set of antenna elements comprises at least one antenna element.

Preferably, the network slice is also provided at a core of the telecommunication network. Preferably, the network slice is an end-to-end network slice.

Preferably, the method further comprises the step of receiving a command to establish the network slice at the radio access point, and performing the step of reserving the portion of the plurality of antenna elements in response to the command. Preferably, the command is provided by the core of the telecommunication network. Preferably, the command is communicated to the radio access point by means of a network orchestrator.

Preferably, the command comprises a specified number of antenna elements that the set of antenna elements is to consist.

Preferably, the number is selected in dependence upon a performance requirement of the network slice. Optionally, the performance requirement is pre-defined.

Preferably, the steps of reserving, receiving, identifying, determining and/or processing are only performed by a portion of the telecommunications network that is entirely upstream of the UE. As used herein, the term "upstream" preferably connotes away from the UE and towards the network core. As such, the steps may be performed by only the radio access point and the network core, entirely without interaction with the UE, such that the method is therefore invisible to the UE.

Preferably, the processing is performed by a Radio Resource Unit of the radio access point.

Preferably, the method further comprises the step of identifying available antenna elements from information provided by the Radio Resource Unit, wherein the step of reserving of the plurality of antenna elements is performed in dependence on identifying the available antenna elements.

Preferably, the processing comprises joint interference cancellation processing.

Optionally, the telecommunications network is in the form of a wide-area cellular telecommunications network. Optionally, the telecommunications network is in the form of a wireless local area telecommunications network.

Preferably, the plurality of antenna elements form part of a MIMO antenna array. Preferably, the plurality of antenna elements are configured as co-operating antenna elements. Preferably, the radio access point is in the form of a gNodeB or an eNodeB.

According to another aspect of the invention, there is provided a computer-readable carrier medium comprising a computer program, which, when the computer program is executed by a computer, cause the computer to carry out the steps as described above.

According to yet another aspect of the invention, there is provided a radio access point for providing a radio access network for a cellular telecommunications network, the radio access point comprising: a plurality of antenna elements each for receiving a wireless signal from a User Equipment (UE) of the telecommunication network; a processor configured to: reserve a portion of the plurality of antenna elements for use only by a given network slice, the reserved portion of antenna element(s) forming a set of antenna elements; identify the UE from the received wireless signal; determine that the identified UE is allocated to the given network slice; and in response, process only the or each wireless signal as received by the set of antenna elements.

The invention includes any novel aspects described and/or illustrated herein. The invention also extends to methods and/or apparatus substantially as herein described and/or as illustrated with reference to the accompanying drawings. The invention is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The invention also provides a method of transmitting a signal, and a computer product having an operating system that supports a computer program for performing any of the methods described herein and/or for embodying any of the apparatus features described herein.

Any apparatus feature may also be provided as a corresponding step of a method, and vice versa. As used herein, means plus function features may alternatively be expressed in terms of their corresponding structure, for example as a suitably-programmed processor.

Any feature in one aspect of the invention may be applied, in any appropriate combination, to other aspects of the invention. Any, some and/or all features in one aspect can be applied to any, some and/or all features in any other aspect, in any appropriate combination. Particular combinations of the various features described and defined in any aspects of the invention can be implemented and/or supplied and/or used independently.

As used throughout, the word 'or' can be interpreted in the exclusive and/or inclusive sense, unless otherwise specified.

BRIEF DESCRIPTION OF THE DRAWINGS

The invention extends to a method for controlling a radio access point, and to a radio access point described herein and/or substantially as illustrated with reference to the accompanying drawings. The present invention is now described, purely by way of example, with reference to the accompanying diagrammatic drawings, in which.

SPECIFIC DESCRIPTION

Figure 1:
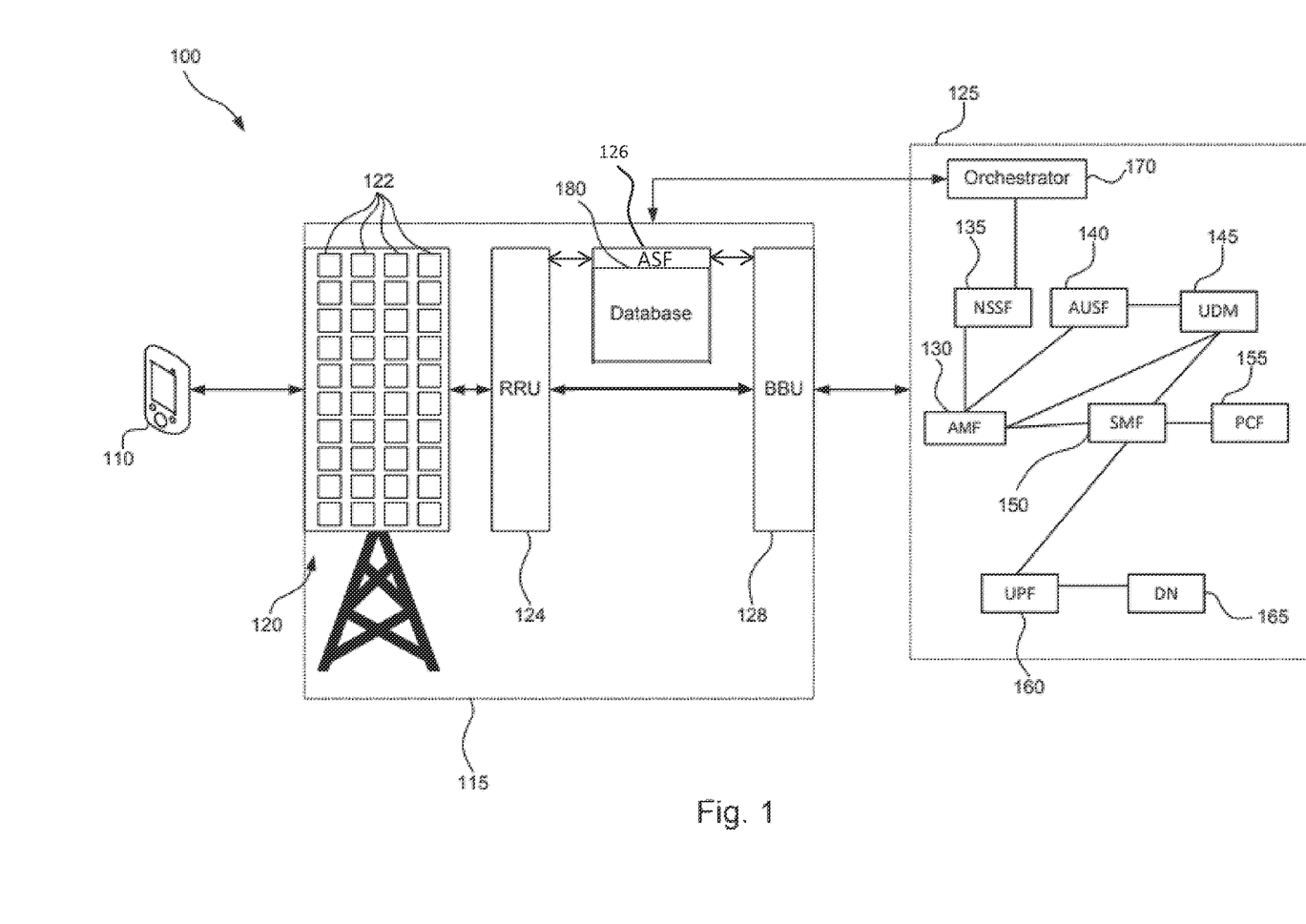
FIG. 1 is a schematic diagram of an exemplary telecommunications network.

FIG. 1 is a schematic diagram of an exemplary telecommunications network 100 in the form of a wide-area cellular telecommunications network, which comprises User Equipment (UE) 110 that is configured to utilise the telecommunications network 100 by accessing a Radio Access Network (RAN), as provided by a RAN access point 115 (e.g. in the form of a macro-, micro-, pico- or femto-cell site). In turn, the RAN access point is connected to a core 125 portion of the network 100.

In this example, the network 100 operates in accordance with, for example, 5G technology. Accordingly, the core network 125 comprises the following functional components (their general functions being understood in the art):

Access and mobility Management Function (AMF) 130;
Network Slice Selection Function (NSSF) 135;
AUthentication Server Function (AUSF) 140;
Unified Data Management (UDM) 145;
Session Management Function (SMF) 150;
Policy Control Function (PCF) 155;
User Plane Function (UPF) 160;
Data Network (DN) 165; and
A Network Orchestrator 170.

By means, at least, of the aforementioned functional components of the core network 125, the network 100 provides and manages a plurality of network slices. In particular, the NSSF 130 is configured to identify and to select a suitable network slice for the UE 110, and network communications with the UE are then processed using the identified network slice.

The radio access point 115 comprises: a multi-antenna array 120; a Remote Radio Unit (RRU) 124; an Antenna Selection Function (ASF) 126; and a BaseBand Unit (BBU) 128. The ASF 126 is in communication with the RRU and the BBU, which are also in communication with one another. The Network Orchestrator 170 is in communication with the radio access point 115, and specifically with at least the ASF 126.

As described below, the telecommunications network 100, and in particular the radio access point 115, is configured also to provide network slicing functionality at the RAN.

The multi-antenna array 120 comprises a plurality of antenna elements 122, each of which comprises a radio-frequency chain (e.g. a transceiver, an encoder, a decoder, an amplifier, a filter, etc.) for receiving and processing network communications (to and from wireless signals). In the example shown in FIG. 1, the multi-antenna array 120 is composed of a 4×10 array of antenna elements 122.

The multi-antenna array 120 is operated, as is known in the art, so as to make use of spatial (and therefore also time) differences in the receipt of wireless signals across the antenna elements so as to help improve wireless signal processing. In particular, the multi-antenna array utilises a Multiple-Input, Multiple-Output (MIMO) method, and in particular a Multi-User MIMO method. Accordingly, the RRU 124 is configured selectively to use individual antenna elements 122 for transmission and to demodulate signal streams received by different antenna elements 122 into separate channels. For example, such demodulation is performed using a linear decorrelator and/or joint interference cancellation processing, as is known in relation to MIMO. In one example, the multi-antenna array 120 is in the form of a Minimum Mean-Square Error (MMSE) receiver.

In order to provide network slicing functionality at the radio access point 115, the telecommunications network 100 is configured to reserve radio resources at the radio access point 115, and in particular to reserve specific antenna elements 122, for exclusive use by a given network slice by segregating traffic from the antenna elements 122 based on an allocation of UE traffic to a specific network slice.

RAN Network Slice Creation

Figure 2:
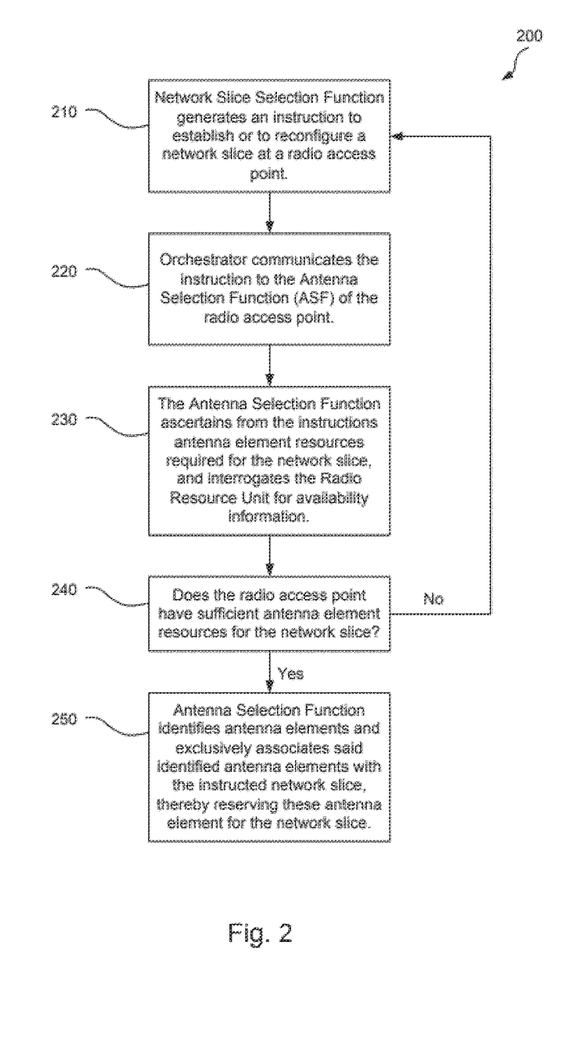
FIG. 2 is a process for providing network slice functionality at a radio access network of the telecommunications network.

A process 200 of establishing network slices at the radio access point 115 is now described with reference to FIG. 2, which exemplarily refers to the telecommunications network 100 of FIG. 1.

In a first step 210, the NSSF 135 generates an instruction to establish a RAN network slice (including reconfiguring an existing RAN network slice). The instruction includes: identity information, identifying the radio access point 115 at which to establish the RAN network slice; a unique identifier of the network slice that is to be established (or reconfigured) at the radio access point 115; resource requirement information, specifying the extent to which radio resources are to be allocated to the network slice, including at least a number of antenna elements to be reserved; and population information, which identifies the UEs (such as UE 110) that are allocated to the network slice. The instruction is recorded in a database 180 associated with the ASF 126. The instruction is subsequently communicated 220 to the Network Orchestrator 170, which in turn communicates the instruction to the radio access point 115 specified in the identity information; said instruction is then received by the ASF 126.

The ASF 126 also receives resource availability information from the RRU 124 regarding available radio resources of the multi-antenna array 120. The resource availability information includes, at least, information as to which antenna elements 122 are available (i.e. are not currently reserved for exclusive use by any network slice).

At a next step 230, the ASF 126 compares the resource requirement information to the resource availability information; based on this comparison, the ASF then performs processing to determine whether the multi-antenna array has sufficient resources 240 (at least in terms of having an available number of antenna elements 122 equal to the number of required antenna elements specified in the resource requirement information) so as to establish the network slice, as instructed.

If the multi-antenna array 120 has sufficient resources available, then the process proceeds to step 250, at which point the ASF 126 selects a set of available antenna elements (equal in number to those specified in the resource requirement information) and associates the selected set of antenna elements with the network slice, thereby generating mapping information associating specific antenna elements to the specific network slice; said mapping information is recorded in the database 180. Based on the mapping information, the ASF 126 instructs the RRU 124 to effect logical segregation of the multi-antenna array 120 so as to reserve the selected set of antenna elements for exclusive use for network communications that are associated with its mapped network slice.

If, however, the radio access point 115 does not have sufficient radio resources, as determined at step 240, then the process 200 reiterates to step 210, and the NSSF 135 attempts instead to establish the network slice at the RAN by instructing reservation of fewer antenna elements 122, or by scaling down (freeing-up) antenna elements from other network slices at the radio access point.

In one example, the number of antenna elements to be reserved for a given network slice is selected depending, at least, on the type of network slice. For example, a higher-performance network slice (e.g. a URLLC network slice) is designated a greater number of antenna elements than a lower-performance network slice (e.g. an eMBB network slice).

Figure 3A:
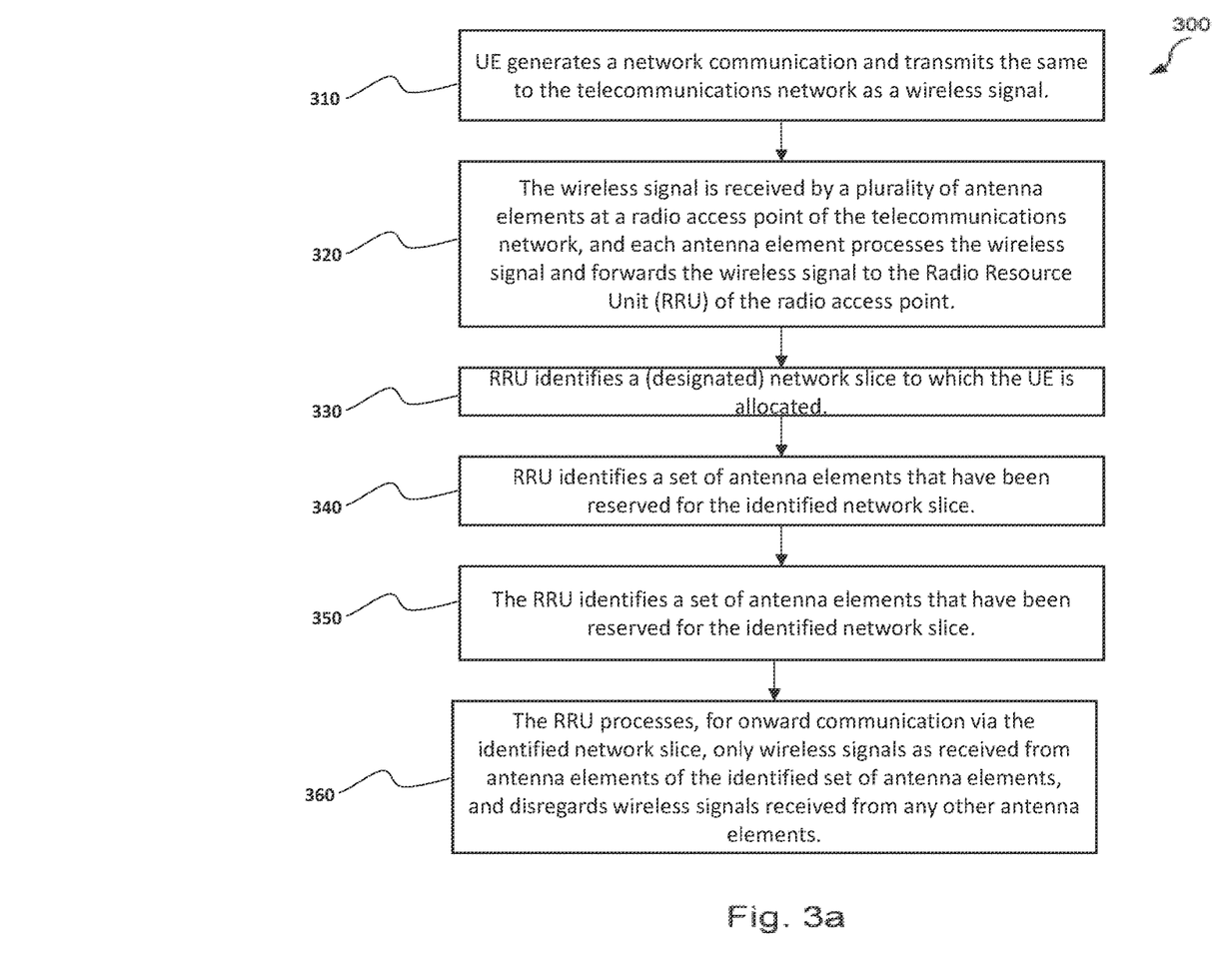
FIGS. 3a and 3b show a process of upstream communication using a network slice of the radio access network.
Figure 3B:
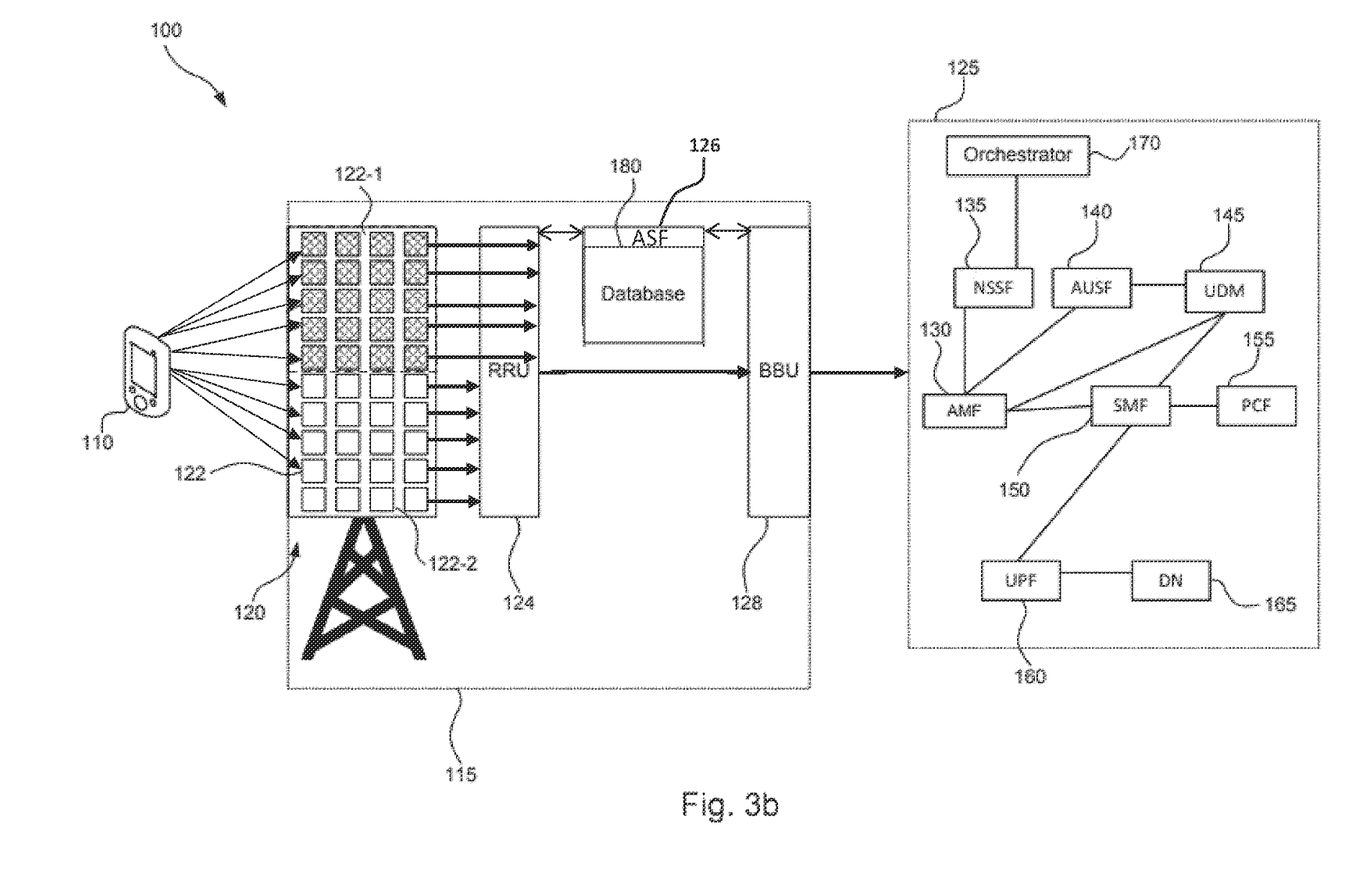

FIG. 3 illustrate a process of upstream communication from the UE 110 to the radio access point 115, in which the radio access point is configured to provide RAN network slicing. In particular, FIG. 3a shows a flow diagram of a process 300 for the processing of upstream network communications, and FIG. 3b schematically shows the pathway of network communications in the telecommunications network (as indicated by means of the arrows).

Process 300 is performed once a RAN network slice has been established, for example as per process 200. As shown in FIG. 3b, and by means of process 200, a set of (4×5) antenna elements 122-1 (which comprises fewer antenna elements than the total number of antenna elements in the multi-antenna array 120) is reserved for exclusive use by a network slice to which the UE 110 is allocated (herein the "designated network slice"); the remaining (4×5) antenna elements 122-2 (i.e. not belonging to set 122-1) are not allocated to the designated network slice (but may or may not be allocated to another network slice). In this way, set 122-1 is logically segregated from the remainder 122-2 of the multi-antenna array 120.

In a first step 310, the UE 110 generates a network communication addressed to the radio access point 115 and subsequently transmits the network communications as a wireless signal.

At a next step 320, the wireless signal is indiscriminately received at a plurality of the antenna elements 122, including antenna elements that are, and that are not, allocated to the set of antenna elements 122-1. Subsequently, each antenna element 122 that receives the wireless signal processes the received wireless signal and individually forwards the wireless signal on to the RRU 124.

At a next step 330, the RRU 124 performs initial processing of each wireless signal received from the antenna elements; said initial processing is performed so as to identify the designated network slice associated with each wireless signal. In one example, identification of the designated network slice is performed by analysing the wireless signals so as to identify the UE 110, for example based on a unique subscriber identifier value, and mapping the identity of the UE 110 to its designated network slice based on the population information (as described with reference to process 200).

Having identified the designated network slice, at a next step 350, the RRU then retrieves the mapping information (as described with reference to process 200) from the ASF 126, so as to identify the antenna elements that are reserved for the designated network slice 110; that is, the RRU performs processing to identify the set of antenna elements 122-1 associated with the designated network slice.

At a final step 360, the RRU only further processes the wireless signals that are received from the antenna elements that are in the identified set of antenna elements 122-1; said further processing is performed at least to prepare the wireless signals into a network communication for onward transmission to the BBU 128. In one example, the further processing by the RRU is demodulation signal processing and/or joint interference cancellation. As a result, the RRU disregards, from said further processing, the wireless signals that are received from the remaining antenna elements 122-2.

In this way, the RRU is available to reduce the extent of further processing by limiting such further processing to only wireless signals that are received by the set of antenna elements 122-1, which may generally be expected to be fewer than the total number of wireless signals received.

The BBU is then available to communicate the network communication from the RRU on to the network core 125 for ongoing processing via the designated network slice.

A process of downstream communication from the radio access point 115 to the UE 110 that utilises RAN network slicing may also be implemented and performed by the radio access point 115, for example according to the disclosures of co-pending UK Patent Application No. 2020140.6 and the corresponding PCT patent application under the Applicant's reference A35542WO01, the contents of which are herein incorporated by reference.

Alternative and Modifications

In the aforementioned, the telecommunications network 100 is generally shown and described as a cellular wide area network. However, in one alternative the telecommunications network is any kind of telecommunications network, including other forms of wide area networks (such as a satellite network), a wired network, a wireless local area network, or combination of network types.

In an alternative example, the instructions, as received by the radio access point 115, also include a priority level. The ASF 126 then instructs the allocation of antenna elements to network slices in a prioritised manner based on the received priority level; this includes transferring an antenna element already reserved to a lower-priority network slice to a new high-priority network slice.

Although shown as a single entity within the core network for simplicity, it will be appreciated that the Network Orchestrator 170 may include various separate entities, such as individual, and distributed, orchestrators for different domains of the telecommunications network such as for the core network, the transport network, the RAN, and for individual radio access points. These individual components of the core network are available to communicate so as to provide end-to-end (i.e. between a radio access point and the core network) orchestration, including to facilitate end-to-end orchestration.

It will be appreciated that the multi-antenna array 120 is available to be segregated into a plurality of sets of antenna elements, wherein each set is reserved for a different network slice (or set of network slices), and wherein the number of antenna elements in each set may be different.

A set of antenna elements that is reserved for a network slice may comprise at least one antenna element, and may have a maximum equal to the total number of antenna elements of the multi-antenna array 120.

At least one antenna element is available to be unreserved, such that no network slice has exclusive use of that antenna element. In this way, network communications for UEs that are not allocated to a network slice may be transmitted via the at least one unreserved antenna element.

In yet another alternative example, a given antenna element may be reserved for at least two network slices, to the exclusion of other network slices. In this way, an antenna element may be shared between a set of network slices.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A method of operating a radio access point so as to provide network slicing functionality, said radio access point providing a radio access network for a telecommunications network and said radio access point comprising a plurality of antenna elements, the method comprising the steps of:
   reserving a portion of the plurality of antenna elements for use only by a given network slice, the reserved portion of the plurality of antenna elements forming a set of antenna elements;
   receiving, at each of the plurality of antenna elements, a wireless signal from a User Equipment (UE) of the telecommunications network;
   identifying the UE from the received wireless signal;
   determining that the identified UE is allocated to the given network slice;
   in response to said determining, the radio access point processing only the wireless signal as received by the set of antenna elements.

2. The method according to claim 1, wherein the given network slice is also provided at a core of the telecommunications network.

3. The method according to claim 2, further comprising the step of receiving a command to establish the given network slice at the radio access point, and performing the step of reserving the portion of the plurality of antenna elements in response to the command.

4. The method according to claim 3, wherein the command comprises a specified number of the reserved portion of the plurality of antenna elements that the set of antenna elements is to consist.

5. The method according to claim 4, wherein the specified number of the reserved portion of the plurality of antenna elements is selected in dependence upon a performance requirement of the given network slice.

6. The method according to claim 1, wherein the steps of reserving, receiving, identifying, determining and/or processing are only performed by a portion of the telecommunications network that is entirely upstream of the UE.

7. The method according to claim 1, wherein the processing is performed by a Radio Resource Unit of the radio access point.

8. The method according to claim 7, further comprising the step of identifying available antenna elements from information provided by the Radio Resource Unit, wherein the step of reserving of the plurality of antenna elements is performed in dependence on identifying the available antenna elements.

9. The method according to claim 1, wherein the processing comprises joint interference cancellation processing.

10. The method according to claim 1, wherein the telecommunications network is in the form of a wide-area cellular telecommunications network.

11. The method according to claim 1, wherein the telecommunications network is in the form of a wireless local area telecommunications network.

12. The method according to claim 1, wherein the plurality of antenna elements form part of a Multiple-Input, Multiple-Output (MIMO) antenna array.

13. A non-transitory computer-readable carrier medium comprising a computer program, which, when the computer program is executed by a computer, cause the computer to carry out the steps of claim 1.

14. A radio access point for providing a radio access network for a cellular telecommunications network and for providing network slicing functionality, the radio access point comprising:
 a plurality of antenna elements each for receiving a wireless signal from a User Equipment (UE) of the cellular telecommunications network;
 a processor configured to:
  reserve a portion of the plurality of antenna elements for use only by a given network slice, the reserved portion of the plurality of antenna elements forming a set of antenna elements;
  identify the UE from the received wireless signal;
  determine that the identified UE is allocated to the given network slice; and
  in response, process only the wireless signal as received by the set of antenna elements.

15. The radio access point according to claim 14, wherein the radio access point is configured to:
 receive a command to establish the given network slice at the radio access point, and
 reserve the portion of the plurality of antenna elements in response to the command.

16. The radio access point according to claim 15, wherein the command comprises a specified number of the reserved portion of the plurality of antenna elements that the set of antenna elements is to consist.

17. The radio access point according to claim 16, wherein the specified number of the reserved portion of the plurality of antenna elements is selected in dependence upon a performance requirement of the given network slice.

18. The radio access point according to claim 14, wherein the radio access point further comprises a Radio Resource Unit configured to perform the processing of the wireless signal.

19. The radio access point according to claim 18, wherein the radio access point is configured to:
 identify available antenna elements from information provided by the Radio Resource Unit, and
 reserve of the plurality of antenna elements in dependence on identification of the available antenna elements.

20. The radio access point according to claim 14, wherein the radio access point is configured to perform joint interference cancellation processing.

* * * * *